US 6,694,965 B1

(12) United States Patent
Chen

(10) Patent No.: US 6,694,965 B1
(45) Date of Patent: Feb. 24, 2004

(54) ADJUSTABLE BARBECUE GRILL

(76) Inventor: Ching-Fei Chen, No. 43, Alley 19, Lane 189, Chang Ma Road, Chang Hua City (TW)

( * ) Notice: Subject to any disclaimer, the term of this patent is extended or adjusted under 35 U.S.C. 154(b) by 0 days.

(21) Appl. No.: 10/352,462

(22) Filed: Jan. 29, 2003

(51) Int. Cl.[7] ............................. F24B 3/00; A47J 37/04
(52) U.S. Cl. ............................. 126/25 A; 126/304 A; 99/393
(58) Field of Search ............................. 126/25 A, 304 A, 126/25 R, 9 R, 9 B, 304 R; 99/393, 399, 443 R

(56) References Cited

U.S. PATENT DOCUMENTS

| | | | | |
|---|---|---|---|---|
| 1,540,434 A | * | 6/1925 | Stone | 126/304 A |
| 3,191,592 A | * | 6/1965 | Lorbacher | 126/25 A |
| 3,478,733 A | * | 11/1969 | Meyerhoefer | 126/9 R |
| 5,363,752 A | * | 11/1994 | Weil | 99/445 |
| 6,557,544 B2 | * | 5/2003 | Sim | 126/25 A |

FOREIGN PATENT DOCUMENTS

| | | | | |
|---|---|---|---|---|
| FR | 2 759 888 A1 | * | 8/1998 | A47J/37/04 |
| JP | 09-065985 A | * | 3/1997 | A47J/37/07 |

* cited by examiner

*Primary Examiner*—Josiah Cocks
(74) *Attorney, Agent, or Firm*—Harrison & Egbert

(57) ABSTRACT

A barbecue grill includes a base on which a first expandable unit and a second expandable unit are uprightly mounted such that the first expandable unit is fastened to two first cross bars of a stand, and such that the second expandable unit is fastened to two second cross bars which are rested on the first cross bars. A charcoal holder is supported by the first cross bars. A cooking grid or plate is supported by the second cross bars. As the stand is adjusted in height by the first expandable unit, the charcoal holder and the cooking grid are simultaneously raised or lowered. As the second expandable unit is adjusted, the second cross bars are caused to move away from or toward the first cross bars, thereby resulting in an adjustment in distance between the cooking grid and the charcoal holder.

3 Claims, 7 Drawing Sheets

ADJUSTABLE BARBECUE GRILL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a barbecue grill, and more particularly to an adjustment mechanism of the barbecue grill.

BACKGROUND OF THE INVENTION

The conventional barbecue grill is devoid of an adjustment mechanism by which the height of the support frame or the distance between the charcoal holder and the cooking grid can be adjusted. In light of such a deficiency as described above, the appeal of the conventional barbecue grill to consumers is seriously undermined.

BRIEF SUMMARY OF THE INVENTION

The primary objective of the present invention is to provide a barbecue grill with an adjustment mechanism by means of which the barbecue grill is adjustable in height and in the distance between the broiling grid and the charcoal holder.

In keeping with the principle of the present invention, the foregoing objective of the present invention is achieved by a barbecue grill comprising a grill framework which is formed of a stand, a charcoal holder, and a cooking grid or plate. The charcoal holder and the cooking grid or plate are mounted on the stand such that the stand, the charcoal holder and the cooking grid or plate can be simultaneously adjusted in distance in relation to a surface on which the barbecue grill is located, and that the cooking grid or plate can be independently adjusted in distance in relation to the charcoal holder.

The stand is provided on the upper side with two first cross bars and two second cross bars which are rested on the first cross bars. The charcoal holder is supported by the first cross bars while the cooking grid is supported by the second cross bars. The first cross bars are supported by a first expandable unit which is uprightly mounted on a base. The second cross bars are supported by a second expandable unit which is uprightly mounted on the base. The base is provided with a plurality of wheels to facilitate the moving of the barbecue grill on the surface.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
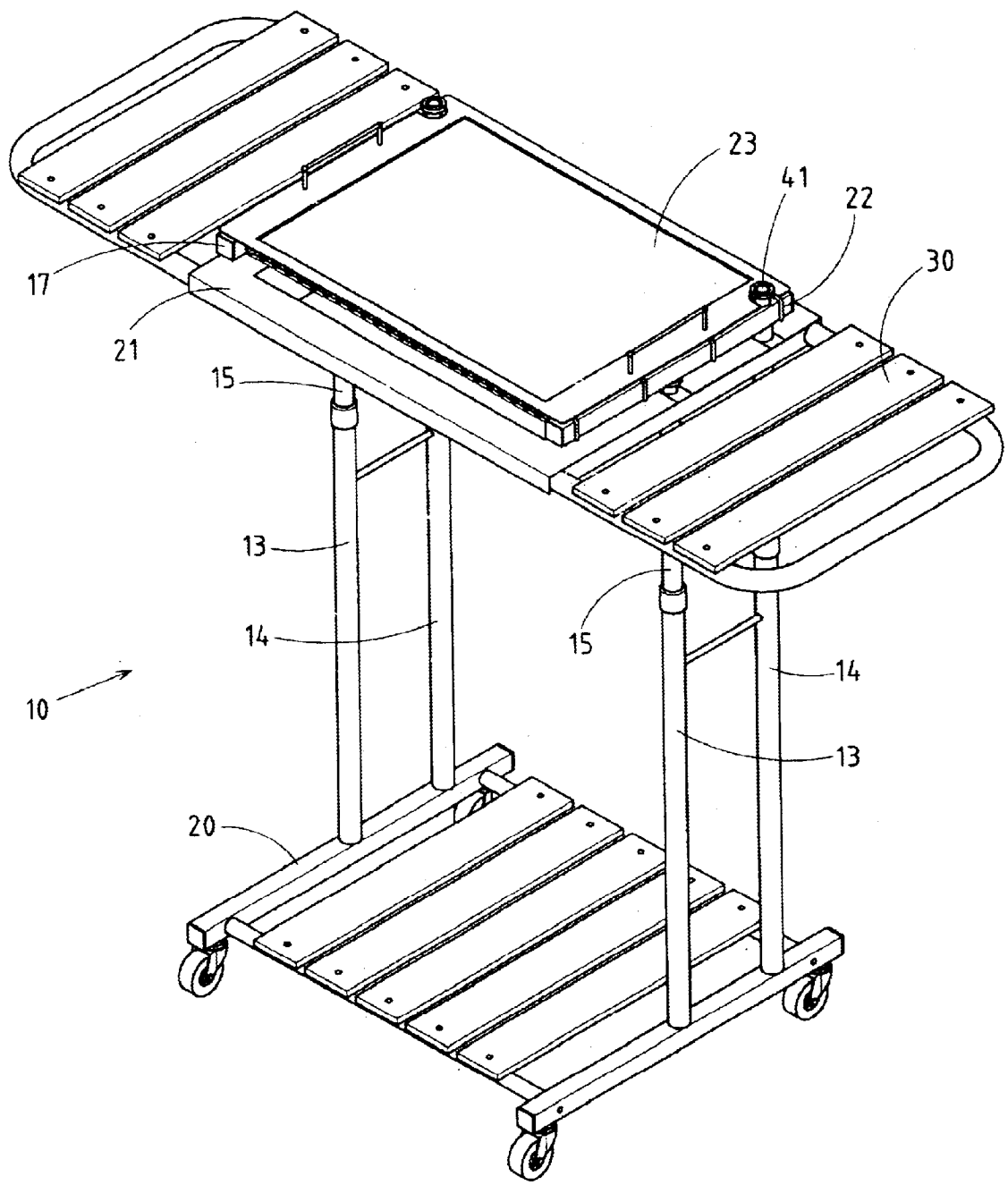
FIG. 1 shows a perspective view of the preferred embodiment of the present invention.
Figure 2:
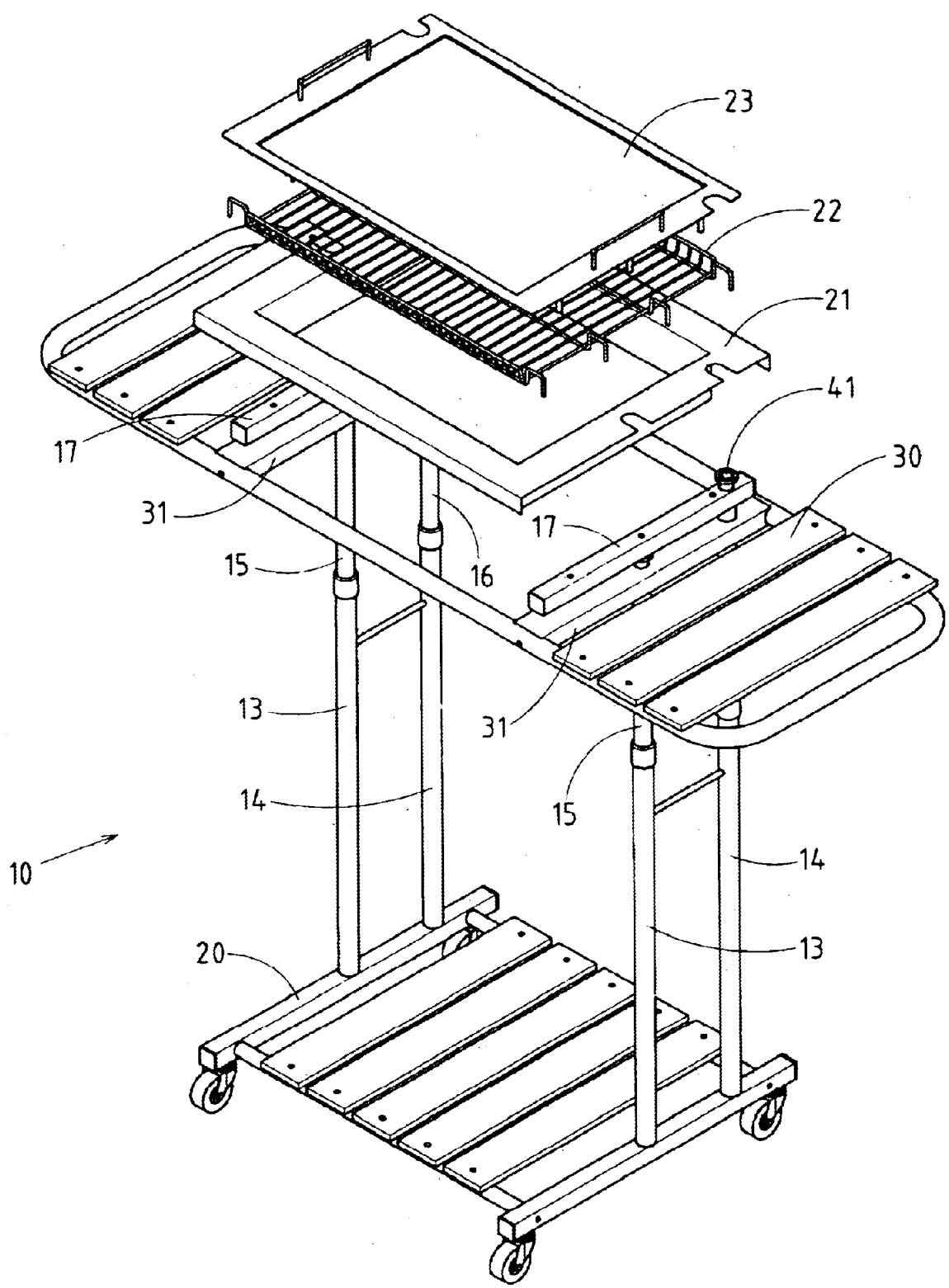
FIG. 2 shows a partial exploded perspective view of the preferred embodiment of the present invention.
Figure 3:
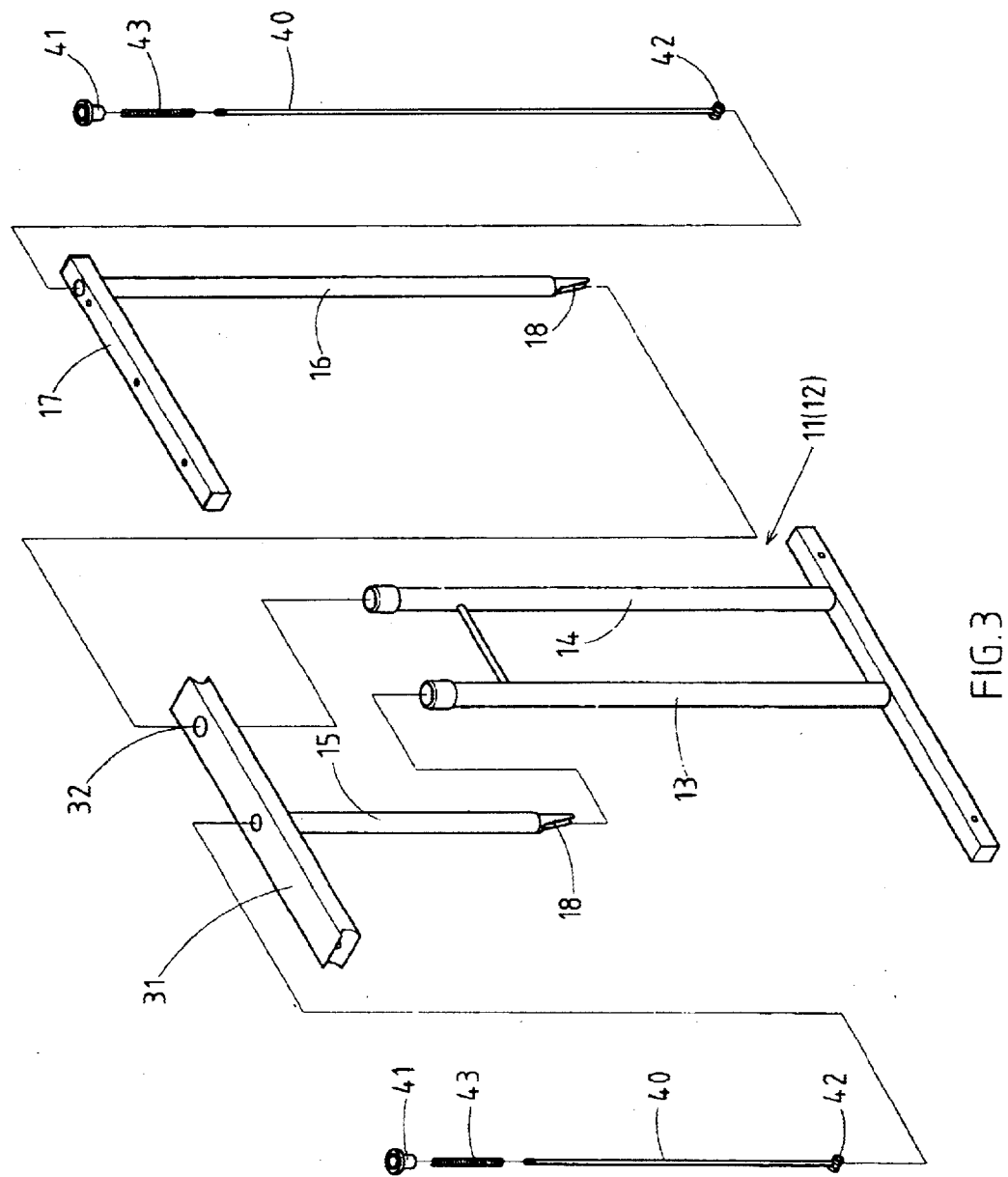
FIG. 3 shows an exploded perspective view of the first expandable rod and the second expandable rod of the preferred embodiment of the present invention.
Figure 4:
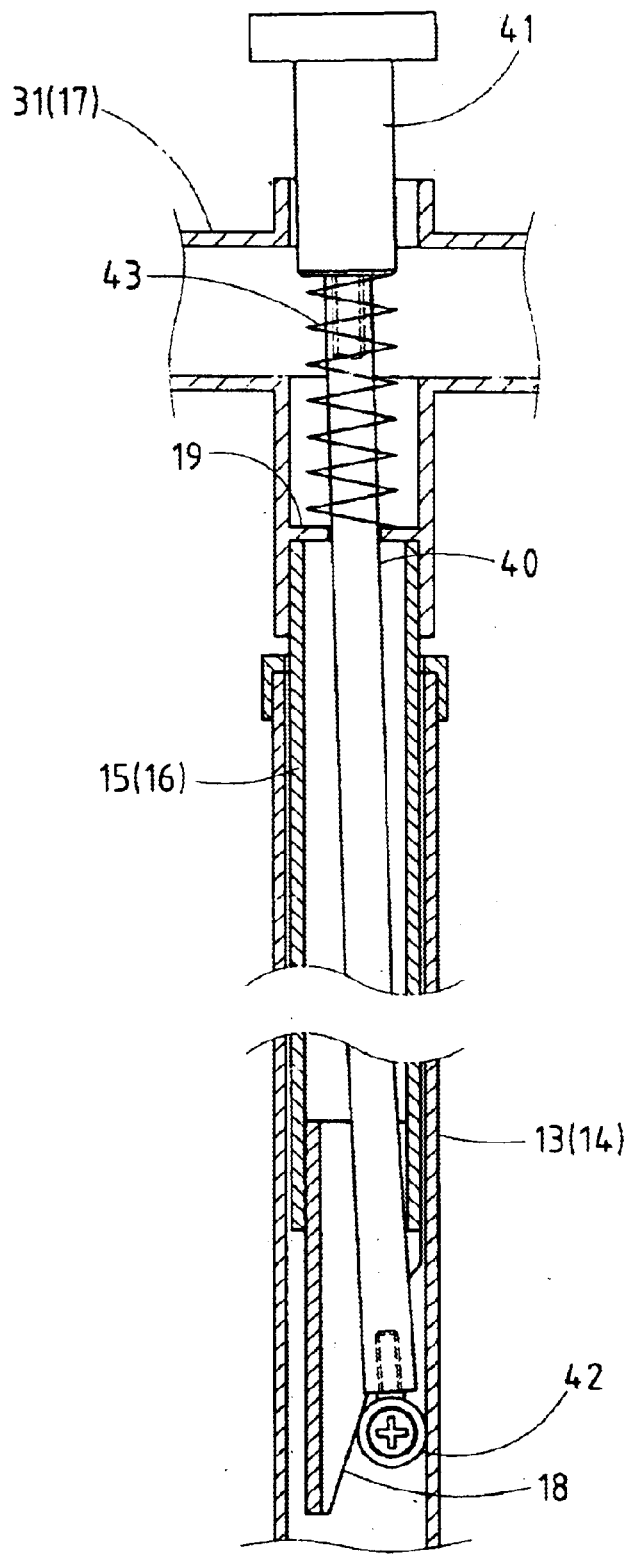
FIG. 4 shows a longitudinal sectional view of the first (second) expandable rod of the preferred embodiment of the present invention in the expansion state.
Figure 5:
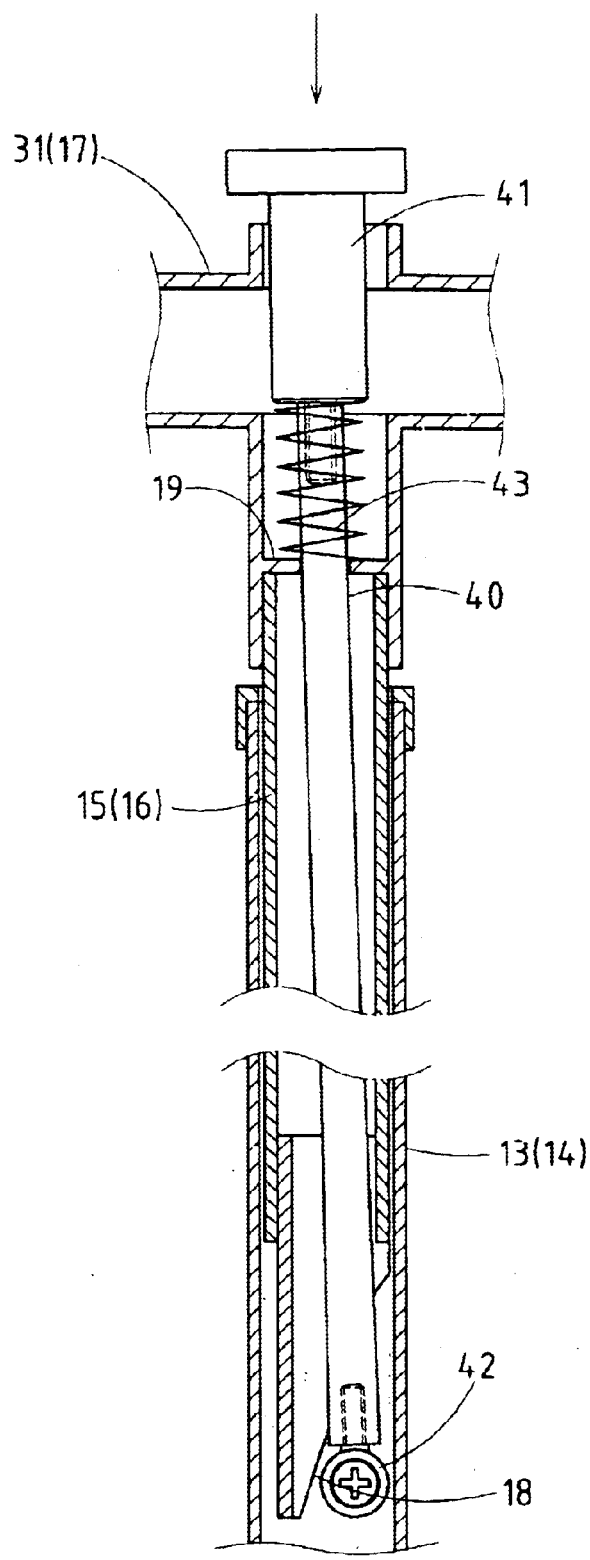
FIG. 5 shows a longitudinal sectional view of the first (second) expandable rod of the preferred embodiment of the present invention in the contraction state.

As shown in FIGS. 1, and 2, a barbecue grill embodied in the present invention comprises a grill framework 10 which is formed of two first outer tubes 13, two second outer tubes 14, a stand 30, two first cross bars 31, two second cross bars 17, a charcoal holder 21, a cooking grid 22, and a cooking plate 23. The two first outer tubes 13 and the two second outer tubes 14 are fastened at the bottom end with a base 20. As shown in FIGS. 3–5, the first outer tubes 13 are fastened at the top end with the two first cross bars 31 which are fastened with the upper side of the stand 30. The charcoal holder 21 is mounted on the two first cross bars 31. The second outer tubes 14 are fastened at the top end with the two second cross bars 17 which are respectively rested on the first cross bars 31. The cooking grid 22 and the cooking plate 23 are mounted on the second cross bars 17. The first outer tubes 13 are provided with a first fitting tube 15, which is fastened at the top end with the first cross bar 31 and is provided at the bottom end with a bevel 18. The first fitting tube 15 is movably fitted into the first outer tube 13 in conjunction with an adjustment rod 40, which is provided at the top end with an adjustment knob 41 in conjunction with a spring 43 and is provided at the bottom end with a wheel 42. When the first fitting tube 15 is in the expansion state, as illustrated in FIG. 4, the wheel 42 is caught between the bevel 18 of the first fitting tube 15 and the inner wall of the first outer tube 13. When the adjustment knob 41 is exerted on by an external force, as illustrated in FIG. 5, the spring 43 is contracted. In the meantime, the wheel 42 moves downward. The spring 43 is located between the knob 41 and a stop edge 19 of the first fitting tube 15.

The second outer tubes 14 are provided with a second fitting tube 16, which is fastened at the top end with the second cross bar 17 and is provided at the bottom end with the bevel 18. The second fitting tube 16 is movably fitted into the second outer tube 14 in conjunction with an adjustment rod 40. The second fitting tube 16 is similar in expansion-contraction mechanism to the first fitting tube 15, as illustrated in FIGS. 4 and 5. It must be noted here that the second fitting tube 16 is fitted into the second outer tube 14 via a through hole 32 of the first cross bar 31, as illustrated in FIG. 3, with the second cross bar 17 being rested on the first cross bar 31.

Figure 6:
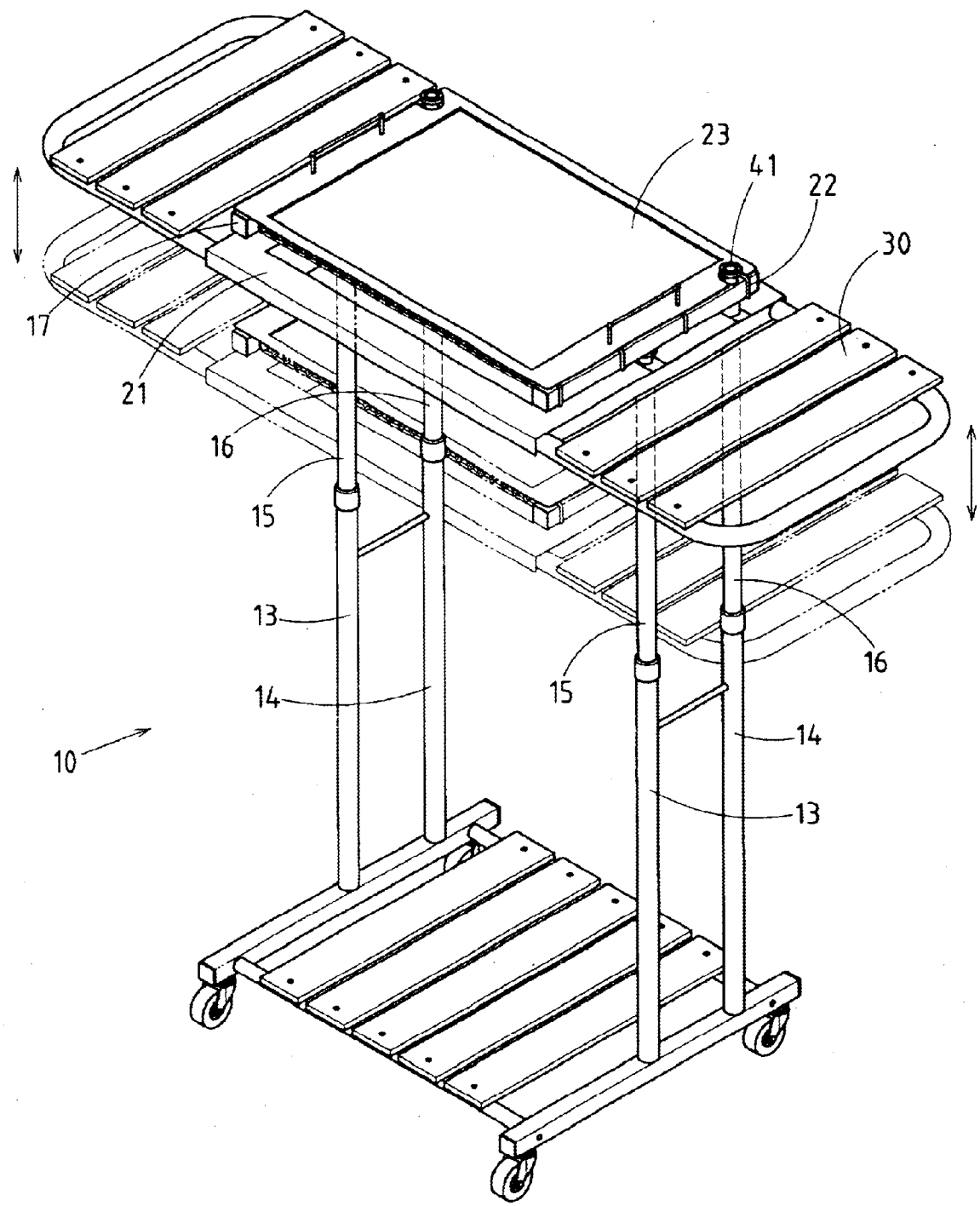
FIG. 6 shows a schematic view of an elevated stand of the preferred embodiment of the present invention.

As illustrated in FIG. 6, the stand 30 is adjusted in height by the first expandable unit which is formed of the first outer tubes 13, the first fitting tubes 15, and the adjustment knobs 41. As the stand 30 is lifted, the charcoal holder 21, the cooking grid 22 and the cooking plate 23 are simultaneously raised.

Figure 7:
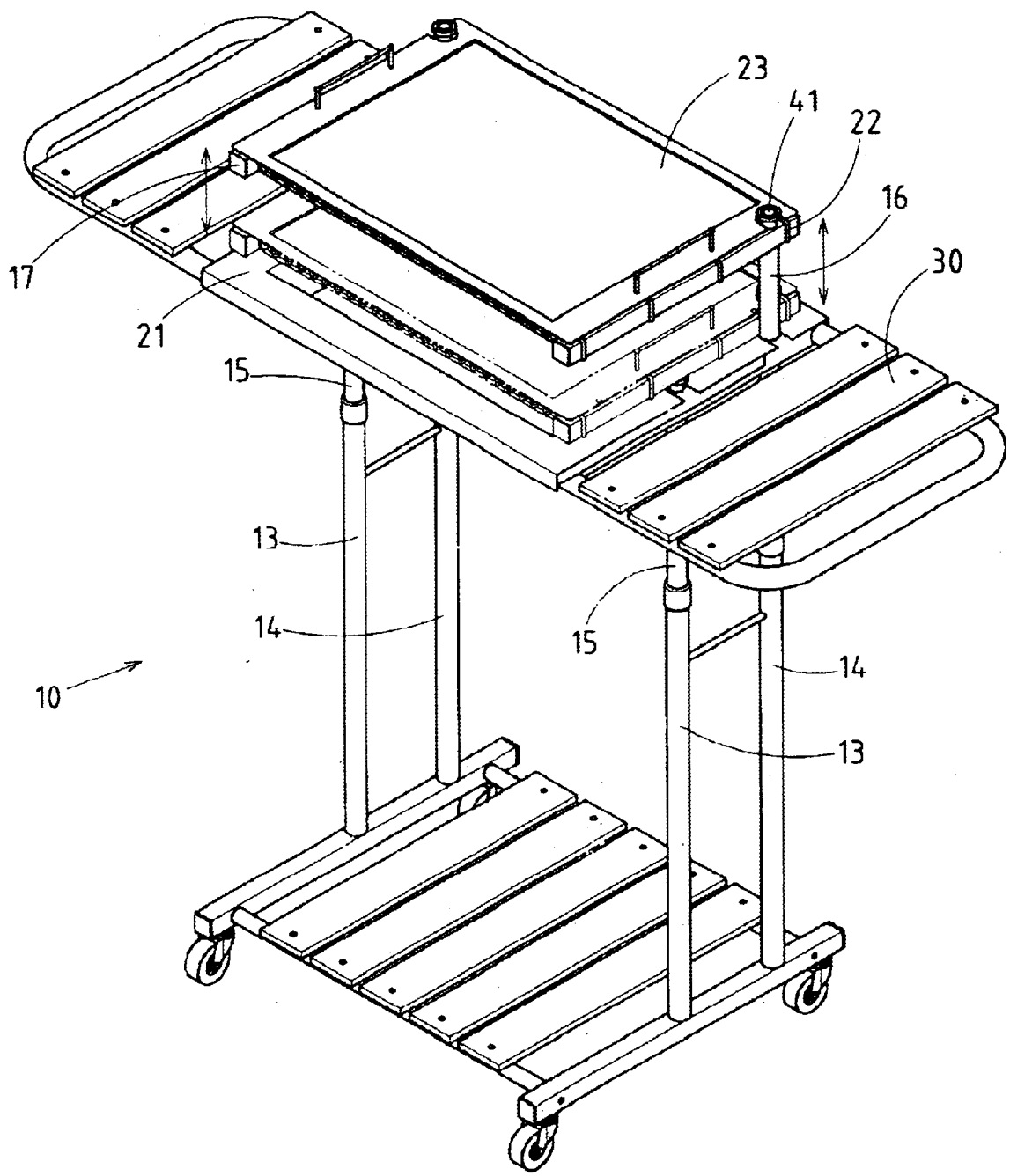
FIG. 7 shows a schematic view of an elevated grid or plate of tile preferred embodiment of the present invention.

As illustrated in FIG. 7, the cooking grid 22 and the cooking plate 23 are simultaneously lifted by the second cross bars 17 which are in turn raised by the second expandable unit which is formed of the second outer tubes 14, the second fitting tubes 15, and the adjustment knobs 41. In another words, the cooking grid 22 and the cooking plate 23 are raised or lowered in a manner independent of the charcoal holder 21, so as to adjust the distance between the charcoal holder 21 and the cooking grid 22 or cooking plate 23.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A barbecue grill comprising:

a base;

a first expandable unit mounted uprightly on said base;

a second expandable unit mounted uprightly on said base;

a stand mounted on said base by said first expandable unit;

a charcoal holder mounted on said stand; and a cooking grid or plate mounted on said stand such that said cooking grid or plate is located over said charcoal holder;

wherein said stand is comprised of, in an upper side, two first cross bars fastened thereto, and two second cross bars resting on said two first cross bars, said two first cross bars being supported by said first expandable unit, said two second cross bars being supported by said second expandable unit via a through hole of each of said two first cross bars such that said two second cross bars can be actuated by said second expandable unit to move away from or toward said two first cross bars; wherein said charcoal holder is mounted on said two first cross bars of said stand; wherein said cooking grid or plate is mounted on said two second cross bars of said stand.

2. The barbecue grill as defined in claim 1, wherein said first expandable unit comprises two first outer tubes, two first fitting tubes, and two adjustment rods, said two first outer tubes being fastened at a bottom end to said base, said two first fitting tubes being fastened at a top end to said two first cross bars of said stand such that a bottom end of each of said two first fitting tubes is fitted into a top end of one of said two first outer tubes in conjunction with one of said two adjustment rods whereby said two adjustment rods are comprised of, at a top end, an adjustment knob fastened thereto in conjunction with a spring, and at a bottom end, a wheel fastened thereto; wherein said second expandable unit comprises two second outer tubes, two second fitting tubes, and two adjustment rods, said two second outer tubes being fastened at a bottom end to said base, said two second fitting tubes being fastened at a top end to said two second cross bars of said stand via said through holes of said two first cross bars such that a bottom end of each of said two second fitting tubes is fitted into a top end of one of said two second outer tubes in conjunction with one of said two adjustment rods whereby said two adjustment rods are comprised of, at a top end, an adjustment knob fastened thereto in conjunction with a spring, and at a bottom end with a wheel fastened thereto.

3. The barbecue grill as defined in claim 2, wherein said two first fitting tubes of said first expandable unit are provided at the bottom end with a bevel; wherein said two second fitting tubes of said second expandable unit are provided at the bottom end with a bevel.

* * * * *